United States Patent [19]
Hutchison et al.

[11] Patent Number: 5,237,337
[45] Date of Patent: Aug. 17, 1993

[54] METHOD AND APPARATUS FOR MANUFACTURING AND ERECTING CONCAVE METALLIC MEMBRANE TYPE REFLECTORS

[75] Inventors: Joseph A. Hutchison; Paul T. Schertz, both of Dallas, Tex.

[73] Assignee: Solar Kinetics, Inc., Dallas, Tex.

[21] Appl. No.: 643,551

[22] Filed: Jan. 18, 1991

[51] Int. Cl.$^5$ ............................................. H01Q 19/12
[52] U.S. Cl. .................................. 343/840; 206/390; 359/900
[58] Field of Search ................ 206/390, 408; 343/912, 343/915, 840; 359/900, 847, 846

[56] References Cited

U.S. PATENT DOCUMENTS

| | | | |
|---|---|---|---|
| 1,850,856 | 3/1932 | Weindel | 206/390 |
| 3,337,871 | 8/1967 | Greenberg | 343/915 |
| 3,576,566 | 4/1971 | Cover | 343/915 |
| 3,599,218 | 8/1971 | Williamson | 343/915 |
| 3,729,743 | 4/1973 | Fletcher | 343/915 |
| 4,030,102 | 6/1977 | Kaplan | 343/915 |
| 4,352,112 | 9/1982 | Leonhardt et al. | |
| 4,899,167 | 2/1990 | Wesphal | 343/912 |

OTHER PUBLICATIONS

Science Applications International Corp., "Advanced Composite Membrane Technology Final Report" SAIC Contract No. 063473 University of Ariz. Contract No. XK-6-06034-1 May 5, 1987.
L. M. Murphy, C. Tuan, Solar Energy Research Institute, "The Formation of Optical Membrane Reflector Surfaces Using Uniform Pressure Loading", SERI/-TR-253-3025, Golden Col. Aug. 1987 pp. iii-viii, 1-2, 29-31.
Solar Kinetics Inc. "Contractor Report: Development of a Stretched Membrane Dish—Phase I" SAND-8-8-7035, Mar. 1989 pp. 1-3, 43-74, 97-100.
Bakr H. Khoshaim, "50 KW-Solar Membrane Concentrator" pp. 3-7, 14-19, 37-39, 56-58 —Soleras Workshop, MRI/SOL—1301 Kansas City, Mo., pp. 20-63.
"Solar Power-Plant with a Membrane Concave Mirror 50 kW", 10 pp. Germany, 1985.
C. Kutscher et al., "Membrane Dish Research Task FY 1987 Progress Report".

Primary Examiner—Henry E. Raduazo
Attorney, Agent, or Firm—Crutsinger & Booth

[57] ABSTRACT

The present invention provides a method and apparatus for manufacturing at a manufacturing plant concave metallic membrane for concave reflectors such as solar energy collectors and antennas, rolling the concave metallic membrane onto a uniquely shaped mandrel for storage and transportation, transporting the rolled metallic membrane and mandrel to a site which is remote from the manufacturing plant, erecting a reflector support structure at the remote site, and attaching the concave metallic membrane to the reflector support structure. The invention includes a method for forming the concave metallic membrane into a paraboloid-like shape using non-uniform loading.

16 Claims, 6 Drawing Sheets

METHOD AND APPARATUS FOR MANUFACTURING AND ERECTING CONCAVE METALLIC MEMBRANE TYPE REFLECTORS

TECHNICAL FIELD

The present invention relates to concave reflectors such as solar collectors, antennas, and the like which use a thin concave metallic membrane to define the shape of the reflective surface. More particularly, this invention relates to improvements in the method of manufacturing and installing concave metallic membranes in the reflector frame and apparatus for manufacturing and installing the same.

BACKGROUND OF THE INVENTION

Large rigid reflector surfaces such as in the range of one to seven meters in diameter for use in solar collectors and antennas are expensive and difficult to construct with reflective surfaces having accurate focusing characteristics. Therefore, it is cheaper to form the concave reflective shape from a thin membrane of yieldable material.

One method of manufacturing these thin membrane concave reflectors is to use a uniform pressure differential to plastically deform an initially flat membrane to the concave shape by stretching it beyond its elastic limit. This method is disclosed in the U.S. Pat. to Leonhardt et al. No. 4,352,112 issued Sep. 28, 1982. In the Leonhardt patent, it is suggested that an aluminum sheet 0.5 mm to 1 mm thick be initially stretched to a flat shape and then plastically deformed by applying a uniform pressure differential across the sheet. Leonhardt also teaches varying the thickness of the sheet to achieve a more ideal paraboloid shape. After deformation, the deformed sheet is preferably provided with a rigid foam backing. The rigid foam backing allows handling of the fragile membrane without damage when larger paraboloid reflectors are to be constructed. Transportation of a large rigid membrane is impossible. Therefore, the large rigid membrane must be constructed at the erection site.

A 17 meter in diameter, 15 kw solar membrane concentrator has been constructed utilizing stretched metal membrane. See: 50 KW-Solar Membrane Concentrator, Bakr H. Khoshaim. Mr. Khoshaim's report on this project describes the fabrication at pages 3-5+ and 3-39+, as using the steps of welding a plurality of sheet strips together which are 0.5 milli-meters thick and 1.25 meters wide to form a 17 meter in diameter membrane. The membrane is prestretched and then deformed into a paraboloid-like shape by applying a uniform pressure differential across the membrane. Thereafter, glass mirrors 0.6 mm thick are laminated onto the concave surface of the membrane. The entire process is performed on site.

It is believed that the forming of metallic membranes on site as taught in the prior art was a necessity caused by the inability of those involved to solve the problems associated with transporting large concave metallic membranes. Metallic membranes in the range of thickness which are plastically deformable for use as a reflective shape are highly subject to creasing, kinking and deformation during handling. If a concave membrane is creased, kinked or otherwise deformed during handling, it loses its ideal reflective shape and is not an efficient reflector.

SUMMARY OF THE INVENTION

The present invention provides a method by which the critical process of exactly controlling the plastic deformation of a thin metallic membrane to form a paraboloid-like shape can be performed on a large membrane in a controlled environment of a manufacturing plant and can be later transported and erected at a remote site. In addition, this invention provides apparatus for removing, transporting and installing these fragile metallic membranes to their use site. This invention provides the advantages of performing the critical manufacturing process in the controlled environment of a central manufacturing plant while avoiding the inherent difficulties of performing this highly critical process in the field at the site of erection of these large membrane solar collectors or antennas.

According to the present invention, a thin metallic membrane is assembled and plastically deformed to achieve as near a paraboloid shape as possible. The membrane may be deformed by use of uniform pressure, by non-uniform pressure accomplished by loading the membrane with water, sand or other flowable material, or a combination of both methods. The fragile metallic membrane is at this point permanently deformed into a concave shape and cannot be kinked or further deformed without affecting the efficiency of the reflector.

A mandrel is formed with a length which is at least as great as the diameter of the reflector and according to the present invention, the mandrel has a unique shape which allows a concave shaped membrane to be rolled onto the mandrel without damaging the membrane. The mandrel can then be supported at its ends without any contact to the membrane during shipment. When the membrane arrives at a remote site where a reflector structure has been erected, the mandrel is used to unroll the membrane directly onto the reflector structure. By providing a mandrel which has the unique properties of allowing a concave metallic membrane to be rolled onto it without creasing solves the transportation problem which has frustrated those who have built reflectors of this type in the past.

BRIEF DESCRIPTION OF THE DRAWINGS

The present invention and the advantages it teaches thereof will become apparent to those of skill in the art from the following detailed description and accompanying drawings in which.

DETAILED DESCRIPTION OF THE PREFERRED EMBODIMENTS

Figure 1:
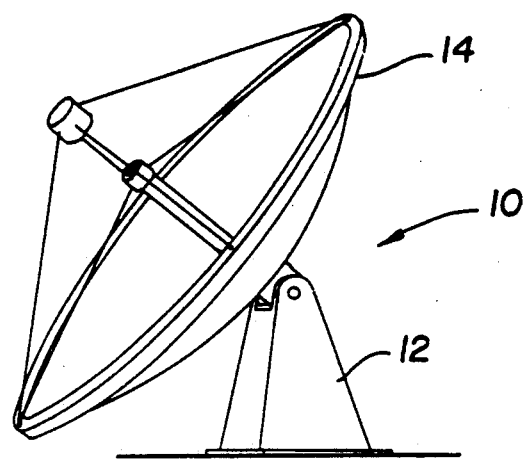
FIG. 1 is a perspective view of the parabolio shaped reflector constructed according to the present invention.

Referring now to the drawings, like reference characters designate corresponding parts throughout the several views. FIG. 1 illustrates a metallic membrane type solar energy collector or antenna assembly, hereinafter referred to generally as a "reflector" which for purposes of description is generally identified by reference numeral 10. Reflector assembly 10 includes a reflector frame 14 supported by a pylon 12. Because the reflector surface is a parabolic shape, the reflector structure is provided with a means (not shown) for aiming or focusing the reflector for optimum performance. Conventional tracking means (not shown) could also be provided to adjust for the change of relative position of the sun or other energy source during the day and seasons of the year.

Figure 2:
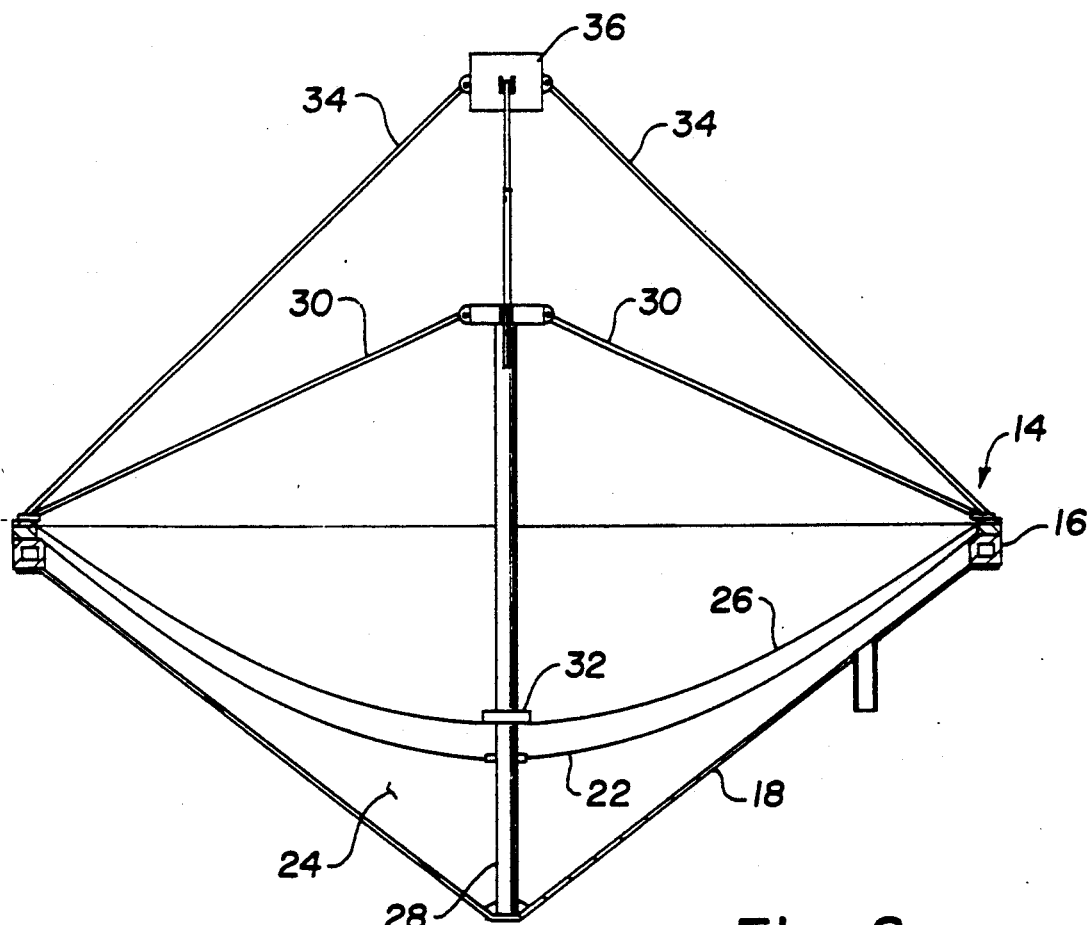
FIG. 2 is a sectional view of the reflector of the present invention.

As is shown in FIG. 2, the reflector frame 14 has a support ring 16 extending around the periphery of the reflective membrane. The rear of the support ring 16 is attached to the back wall 18.

As will be described in detail, metallic membrane 22 has been pre-formed into a paraboloid-like shape for assembly into the reflector assembly 10. The metallic membrane has a focal length defined by the concave surface of the membrane and having an aperture with a radius and diameter defined by the largest circumference of the membrane aperture. For the purpose hereinafter explained, the metallic membrane 22 has been made porous by forming a plurality of small holes (not shown) throughout the surface of the metallic membrane 22. The concave metallic membrane 22 is attached around the periphery of the support ring 16 to define a plenum 24 between the back wall 18 and the metallic membrane 22.

A flexible reflective membrane 26 which is substantially pressure tight is positioned over the concave metallic membrane 22 and attached to the support ring 16. As will be described in detail the reflective membrane is generally concave in shape. The reflective membrane 26, in contrast with the metallic membrane 22, is not porous and when the plenum 24 is at least partially evacuated, the external atmospheric pressure forces the flexible reflective membrane 26 against the parabolic shape of the membrane 22. The flexible reflective membrane 26 is held against the metallic membrane 22 by the differential pressure across the membrane 26.

A hub 28 is axially retained lengthwise through the center of the support ring 16. The hub 28 is fixed at one end to the wall 18 and toward the other end to a plurality of struts 30 which are attached to the support ring 16, thereby defining a cone shaped structure. The hub 28 passes through the membranes 22 and 26. A restraint flange 32 is attached to the hub 28 and the reflective membrane 26. The flange 32 helps to restrain the membranes in place and provides a pressure seal between the hub 28 and the flexible reflective membrane 26.

Another plurality of struts 34 attached to the support ring 16 similarly defines a larger cone shaped structure which supports a receiver 36 at the focal point of the reflector.

Figure 3:
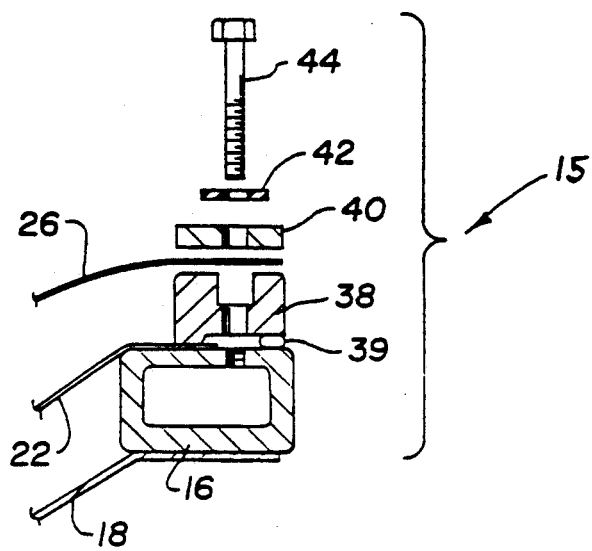
FIG. 3 is an exploded sectional view of the mounting ring of the reflector.

The details of the connection 15 of the metallic membrane 22 and flexible reflective membrane 26 to support ring 16 are shown in FIG. 3. The metallic membrane 22 is clamped between the support ring 16 and a clamp ring 38. A suitable resilient seal ring 39 can be provided to seal the space between the rings 16 and 38. The flexible reflective membrane 26 is clamped between ring 38 and a second clamp ring 40. A plurality of seal washers 42 and fasteners 44 pass through aligned openings in the rings 16, 38 and 40 while clamping the assembly together.

Figure 4:
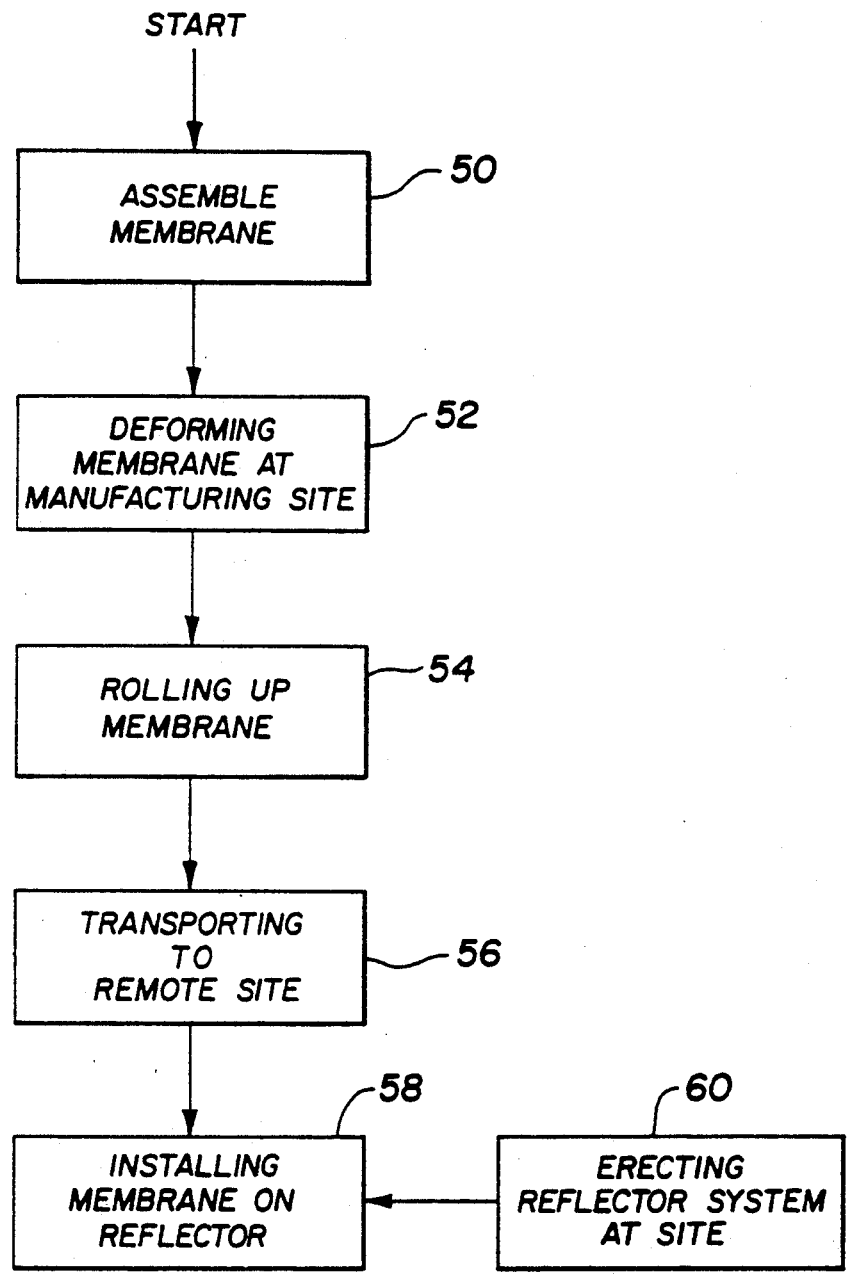
FIG. 4 is a simplified flow diagram of one embodiment of the improved method of the present invention.

In FIG. 4 the method of constructing the reflector is illustrated as a flow diagram. In step 50, the metallic membrane must be assembled into a flat sheet before it can be formed into a parabolic shape. The assembly step 50 can be accomplished by joining a plurality of strips together to form a membrane of sufficient size to cover the reflective surface. If single sheets of sufficient width are available they are preferable since seams can cause distortion in the forming process. In a preferred embodiment the metallic membrane is formed from a stainless steel membrane between the range of onehalf mil to four mil thick. The thickness of the membrane may be non-uniform or uniform.

Once the membrane is assembled, the deforming step 52 can begin. As will be described in detail with respect to FIGS. 5 and 6, the deforming step 52 consists of plastically deforming the flat metallic membrane 22a to a paraboloid-like shaped metallic membrane 22. This manufacturing step 52 is performed at a centralized manufacturing plant with tooling equipment, measuring instruments and other equipment necessary to accurately deform the metallic membrane into a parabolic-like shape.

Once this metallic membrane has been deformed into a fragile concave parabolic shape, difficulty arises in its transport. Following step 52, in step 54 the metallic membrane 22 is rolled up on a mandrel without creasing, kinking, or deforming the membrane as will be described in detail in reference to FIGS. 7 and 8a-d.

Following the step 54 of rolling up the membrane onto the mandrel, the membrane and mandrel assembly are transported in step 56 to a remote site where the reflector assembly 10 is to be assembled. One method of transporting the membrane and mandrel assembly will be described by reference to FIG. 9.

At some point the pylon 12 and reflector frame 14 of the reflector assembly 10 is erected at the remote site in step 60. When the membrane and mandrel assembly arrives at the remote site, the membrane and mandrel assembly is installed in step 58 on the reflector frame 14. The installation step 58 will be described by reference to FIGS. 10a and 10b.

In the method of the present invention as shown in FIG. 4, in step 50 the reflector is manufactured by the steps of assembling the metallic membrane 22a into a shape which then can be plastically deformed in a parabolic shape. Thereafter in step 52 deforming the metallic membrane 22a into a concave parabolic-like shaped metallic membrane 22 at a manufacturing site. At any time after step 52 the metallic membrane may optionally be perforated to form a plurality of small holes throughout its surface so that the metallic membrane 22 is not pressure tight. It also may optionally be perforated to form an appropriately sized hole in the center of the metallic membrane 22 so that the hub 28 may pass therethrough. Thereafter in step 54 removing the concave membrane from the manufacturing process and equipment and rolling it onto a uniquely profiled mandrel for storage and transportation. Thereafter in step 56 transporting the membrane mandrel assembly to a site remote from the manufacturing site. At the remote site in step 60 the pylon 12 and the reflector frame 14 of the reflector assembly 10 is erected to the point where the metallic membrane 22 can be installed. Thereafter in step 58 the membrane is unrolled from the mandrel and attached to the reflector structure. In this manner, large, fragile, non-planar, metallic membranes 22 can be manufactured in the controlled environment of a production plant and transported and installed at remote sites without damaging the fragile metallic membrane 22.

The deforming step will be described in more detail by reference to FIGS. 5 and 6 in which a deforming fixture assembly 70 is shown with a flat metallic membrane 22a installed thereon prior to deformation. The fixture 70 comprises a massive rigid support ring 72, sidewalls 74 and bottom wall 76. The flat metallic membrane 22a and sidewall 74 and bottom wall 76 define a plenum 78. The flat metallic membrane 22a is attached to ring 72 by clamping ring 80 and suitable fasteners (not shown). The clamping ring 80 can be segmented or a continuous piece as desired. The flat metallic membrane 22a is first stretched onto ring 72 and placed in tension to attain as near as possible a planar or flat shape. If desired, the flat metallic membrane 22a can be plastically deformed by stretching radially in the plane of the membrane until all irregularities in the surface are removed.

Figure 5:
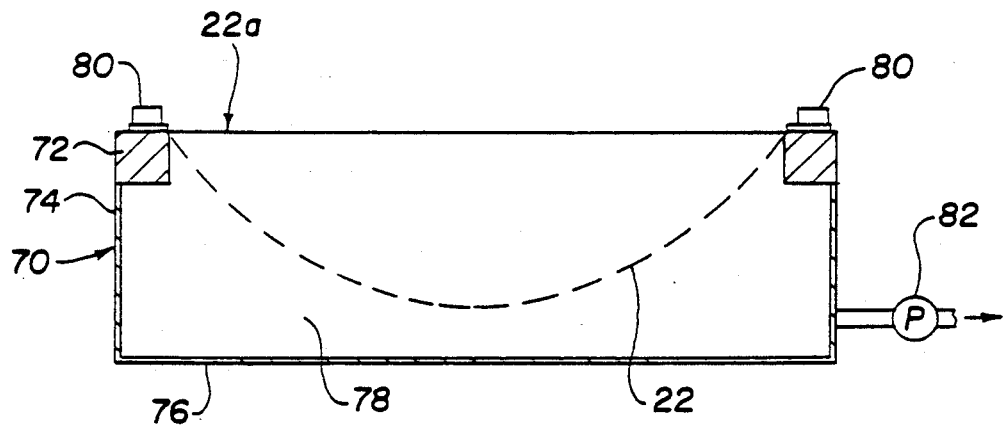
FIG. 5 is a cross sectional view illustrating the step of deforming a metallic membrane to a concave shape by applying a uniform pressure differential.

Thereafter, as shown in FIG. 5, a pump 82 can be used to reduce the pressure of the gases in plenum 78 to cause the flat metallic membrane 22a to be deformed to a concave shape as shown in dotted lines and identified as metallic membrane 22. The pressure differential perpendicular to any instantaneous point on the curved plane of the metallic membrane is uniform. The flat metallic membrane 22a is plastically deformed into the desired concave metallic membrane 22 so that when the uniform pressure differential is removed from the metallic membrane 22 it will retain its concave shape. It is to be understood that the ring 72 must be of a sufficient mass and size to withstand the large forces generated during the deformation process. This deformation process can be performed in accordance with the uniform pressure differential method of the Leonhardt patent.

Unfortunately, a uniform pressure differential produces a concave shape which deviates significantly from the ideal paraboloid-like shape wherein the intersections between the surface of the paraboloid-like shape and any plane that includes the rotational axis of the paraboloid-like shape should define an ideal parabola. An ideal paraboloid-like surface is the most efficient configuration for focusing energy in a reflector. The concave shape produced by the uniform-pressure differential tends to be steeper toward the periphery and shallower toward the center of the concave shape when compared to the ideal paraboloid-like shape. This deviation from the ideal paraboloid-like shape significantly reduces the focusing characteristics of the concave surface and therefore reduces the efficiency of the solar energy collector or antenna.

Leonhardt teaches achieving a more ideal paraboloid-like shape by using a metallic membrane of non-uniform thickness. The metallic membrane deforms under the uniform pressure differential in proportion to the thickness of the membrane. However, it is difficult to manufacture a flat metallic membrane that will deform under a uniform pressure differential to produce a good paraboloid-like shape.

Figure 6:
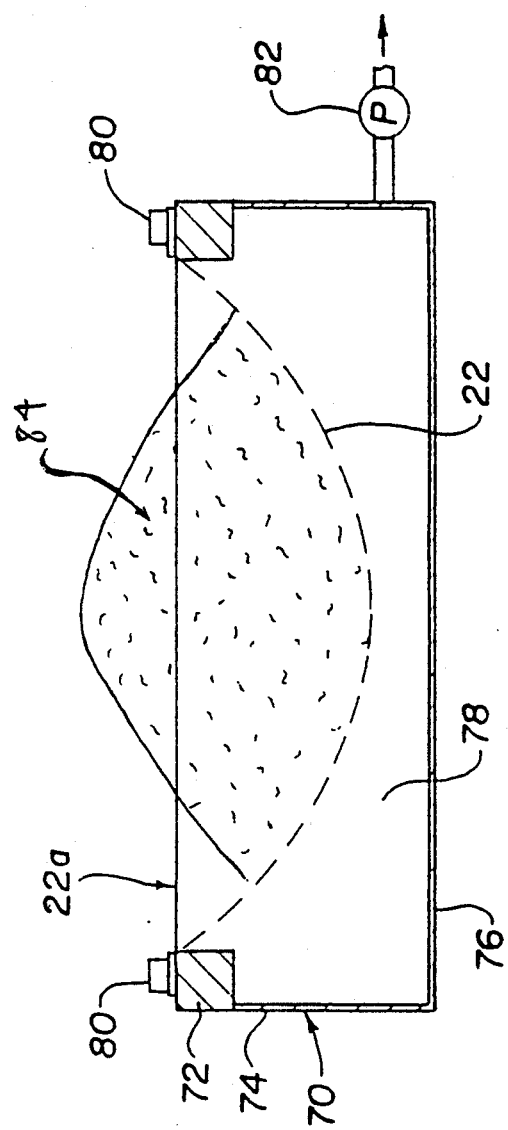
FIG. 6 is a cross sectional view illustrating the step of deforming a metallic membrane to a concave shape by applying a non-uniform pressure differential.

According to one aspect of the present invention, an improved process for deforming the initially flat metallic membrane 22a to produce a concave parabolic-like shape can be accomplished as shown in FIG. 6. Instead of reducing the pressure inside the plenum 78 to produce a uniform pressure differential across the membrane 22, a partially-flowable material 84 such as sand is deposited on top of the stretched metallic membrane 22a. The weight of the sand sitting on the membrane exerts a pressure which causes the membrane to deform or sag into a concave shape. As the membrane deforms and becomes concave, the partially-flowable material 84 moves under the force of gravity toward the lowest point and the depth of the material becomes non-uniform. Furthermore, the material may be piled like a hill or a mountain over the center of the membrane, which causes the depth of the material to decrease rapidly as a function of the radial distance from the center of the metallic membrane 22. Thus the flat metallic membrane 22a is plastically deformed under the non-uniform loading or pressure into concave metallic membrane 22. When the non-uniform pressure is removed from the metallic membrane 22, it retains the concave shape. It is to be understood that the ring 72 must be of a sufficient mass and size to withstand the large forces generated during the deformation process.

The flowable material must be removed gently so that the fragile metallic membrane is not damaged during the process. Removal with a vacuum hose (not shown) is one satisfactory method for removing the flowable materials from the surface of the metallic membrane 22.

Depending on several factors such as the physical characteristics of the metallic membrane, the amount of partially-flowable material placed onto the membrane, the density of the partially-flowable material, and how the material is placed onto the membrane, this improved technique tends to produce a concave shape which closely approximates an ideal paraboloid dish.

Furthermore, it is advantageous to combine the two methods of uniform pressure loading and non-uniform pressure loading. The non-uniform loading method makes manufacturing a metallic membrane having a non-uniform thickness unnecessary.

If the stretched membrane is first partially deformed by either method or a combination of the two methods, a more fluid material such as water may be employed to further plastically deform the metallic membrane to achieve the ideal shape. Before the metallic membrane becomes at least partially concave, any attempt to use water to produce the non-uniform loading would be futile unless the fixture 70 is further equipped with upwardly extending sidewalls to retain the liquid above the metallic membrane.

Once the deformation is completed, the actual support ring on the reflector need not be as stiff or massive in that the forces applied to the ring of a reflector during use do not approach the massive forces applied to the ring 72 during the manufacturing process. In addition, during the manufacturing process, accurate measuring equipment (not shown) can be used to measure the deflections of the membrane 22a to coordinate the operation of the pump and/or the non-uniform loading to achieve the desired concave shape. All of this is achieved within the controlled environment of the central manufacturing plant.

The step of making an appropriate size hole in the center of the permanently deformed metallic membrane 22 so that the hub 28 of the collector 10 may be inserted therethrough may optionally be performed at the manufacturing plant before placing the concave membrane 22 onto the mandrel. Similarly, the step to making a plurality of small holes throughout the metallic membrane 22 so that gases may be evacuated therethrough during the construction of the reflector assembly 10 at the remote site. Otherwise, these two steps can be performed before the metallic membrane 22a is deformed or later, at the remote site of the reflector assembly 10.

Figure 7:
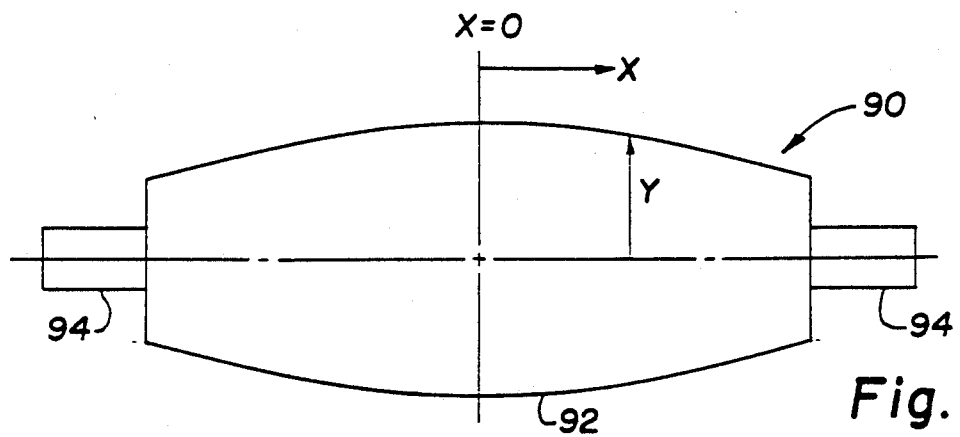
FIG. 7 is a perspective view of a mandrel according to the present invention utilized to roll up a concave metallic membrane.

The step of rolling of the membrane for transport and storage will be described by reference to FIGS. 7 and 8a–d. In FIG. 7 a non-cylindrical mandrel 90 is shown for use in transporting the fragile metallic concave membranes manufactured according to the process shown in FIG. 5. This mandrel has been designed such that a metallic membrane having a paraboloid-like shape can be rolled onto the mandrel without creasing or deforming the membrane. Mandrel 90 has an outer convex surface 92. The axial length of the mandrel is at least as great as the diameter of the membrane aperture. In the preferred embodiment, the surface 92 has a maximum radius at the center of the axial length of the mandrel 90 an optional support shaft 94 extending from the ends of the mandrel. If the mandrel 90 does not have a support shaft 94, it should have some means for handling at the ends so that the delicate metallic membrane 22 does not have to be disturbed. The mandrel has a generally convex surface for which the radius "r" of the mandrel about any point along the axis of the mandrel is determined according to the following formula:

$$r = b - \frac{x^2}{t}.$$

where x = the distance of the point along the axis of the mandrel for which the radius of the mandrel is being determined as measured from the point along the axis for which the radius of the surface is a maximum.
and $$t = \left(\frac{2}{m}\right)\left(\frac{1}{b-s}\right)(a^2 + b^2 + s^2 - 2sb)$$

where
m = 1.99
b = the maximum radius of the mandrel and $$s = \left(\frac{b}{fP}\right)\sqrt{(fP)^2 - a^2}$$

where
f = the focal length of the membrane
a = the radius of the aperture of the membrane
P = 2.06.

The above formula is acceptable for use with membranes whose focal length to diameter ratio is approximately 0.6 and whose aperture is in range 1 to 7 meters. By varying the constants "m" and "p", the formula can be modified to accommodate metallic membranes having paraboloid-like shapes with other dimensions.

In FIGS. 8a–d, removal of the concave metallic membrane 22 from the fixture 70 is shown. Clamp ring 80 is removed and the mandrel is used to wrap the membrane 22 onto the mandrel 90 by progressing from the edge across the width of the fixture 70. Once the membrane 22 is completely rolled onto the mandrel 90, a mandrel membrane assembly 96 is formed and the membrane can be held in place on the mandrel by use of suitable soft wide bands of elastic material or the like (not shown).

Figure 9:
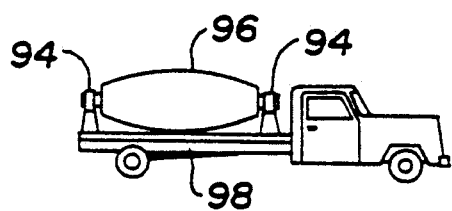
FIG. 9 illustrates a mandrel and membrane assembly being transported.

Transport of the mandrel membrane assembly 96 is shown in FIG. 9 with the assembly 96 supported on the bed of a vehicle 98 on the shaft 94. In this manner, assembly 96 may be transported without contacting the membrane 22. It is envisioned that a suitable cover could be placed over the assembly 96 during transport to prevent damage or it could be transported in an enclosed vehicle.

Figure 10A:
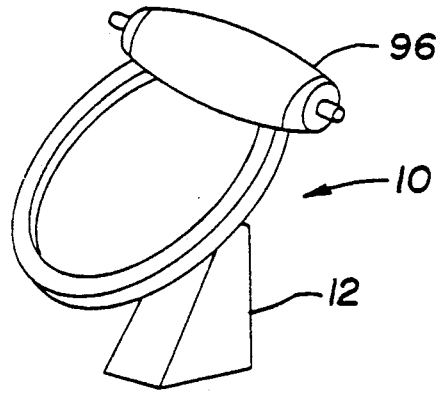
FIGS. 10a and 10b illustrate the step of moving the membrane from the mandrel and installing it on the reflector frame.
Figure 10B:
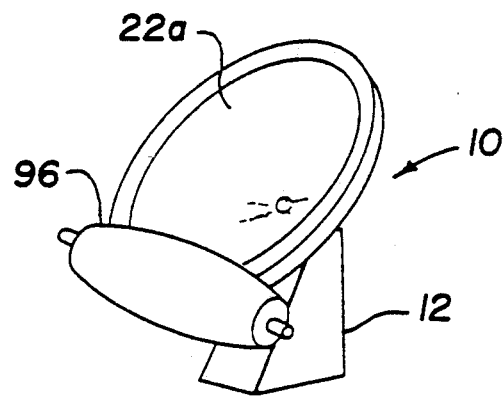

The step of installing the concave metallic membrane 22 on the previously erected reflector structure is shown in FIGS. 10a and 10b. The metallic membrane 22 is unrolled in the installation process in the reverse order in which it was rolled onto the mandrel. As shown in FIG. 10a, the process starts at one edge of the support ring 16 and is rolled onto the ring shown in FIG. 10b. The metallic membrane 22 is then attached to the support ring 16 as shown in FIG. 3. This assembly process can be simply performed without special equipment at the site of the reflector installation and can be performed before or after the support ring 16 is completely assembled in the reflector frame 14.

After the metallic membrane 22 is attached onto the support ring 16, the remainder of the reflector 10 may be assembled. The flexible reflective surface 26 membrane is positioned over the metallic membrane 22 and attached to the support ring 16. Thereafter, the hub 28 is placed through the two membranes and supported by the plurality of struts 30. Finally, the receiver 36 is positioned and retained in place by another set of a plurality of struts 34.

It is to be understood of course that the foregoing description relates to the preferred embodiment of the present invention and that numerous modifications and alterations thereof may be made without departing from the spirit and the scope of the invention as set forth in the appended claims.

What is claimed is:

1. A method of manufacturing and erecting a concave metallic membrane type reflector comprising the steps of:

at a manufacturing site, forming a concave metallic membrane;

rolling the concave metallic membrane onto a non-cylindrical mandrel that has an axial length at least as great as the largest dimension of the metallic membrane and a generally convex surface adapted to support the rolled-up shape of the metallic membrane without creasing or folding the membrane;

transporting the rolled-up metallic membrane and the mandrel to a site which is remote from the manufacturing site; and at the remote site, erecting a reflector frame; and attaching the concave metallic membrane to the reflector frame.

2. The method of claim 1 wherein the step of forming the concave metallic membrane comprises the step of plastically deforming an initially flat metallic membrane having a substantially uniform thickness into a paraboloid-like shape.

3. The method of claim 2 wherein the step of plastically deforming an initially flat metallic membrane into a paraboloid-like shape is accomplished with non-uniform pressure.

4. A method of manufacturing a concave metallic membrane reflector surface for use on a reflector frame, such as an antenna, solar energy collector, or the like, comprising the steps of:
- at a manufacturing site remote from the site of installation of the reflector, permanently deforming an initially flat metallic membrane by stretching to obtains a concave shape having a focal length and having an aperture defining the diameter of the concave membrane; and thereafter
- at the manufacturing site, rolling the deformed membrane on a non-cylindrical mandrel that has an axial length at least as great as the diameter of the metallic membrane and a generally convex surface adapted to support the rolled-up shape of the metallic membrane without creasing or folding the membrane; and thereafter
- transporting the rolled membrane and mandrel to a remote site; and thereafter
- at the remote site, removing the membrane from the mandrel; and thereafter
- at the remote site, attaching the membrane to the reflector frame.

5. The method of claim 4 wherein the step of deforming the metallic membrane comprises plastically deforming the membrane having a substantially uniform thickness to a paraboloid-like shape.

6. The method of claim 5 wherein the step of plastically deforming an initially flat metallic membrane to a paraboloid-like shape is accomplished with non-uniform pressure.

7. The method of claim 5 additionally comprising the step of forming the non-cylindrical mandrel that has an axial length at least as great as the diameter of the metallic membrane and a generally convex surface on the mandrel for which a radius "r" of the mandrel about any point along the axis of the mandrel is determined according to the formula:

$$r = b - \frac{x^2}{t}$$

where
- x = the distance of the point along the axis of the mandrel for which the radius of the mandrel is being determined as measured from the point along the axis for which the radius of the mandrel is a maximum and $$t = \left(\frac{2}{m}\right)\left(\frac{1}{b-s}\right)(a^2 + b^2 + s^2 - 2sb)$$

where
- m = a first constant
- b = the maximum radius of the mandrel and $$s = \left(\frac{b}{fP}\right)\sqrt{(fP)^2 - a^2}$$

where
- f = the focal length of the membrane
- a = the radius of the aperture of the membrane
- P = a second constant.

8. The method of claim 7 wherein the value of the first constant "m" and the second constant "P" are varied whereby the formula defines a mandrel surface that accommodates metallic membranes having a particular focal length to diameter ratio and having a particular diameter.

9. The method of claim 8 wherein the first constant "m" has a value of about 1.99 and the second constant "P" has a value of about 2.06 whereby the formula defines the radii for a mandrel surface that accommodates membranes having a focal length to diameter ratio of about 0.6 and for which the aperture is in the range of 1 to 7 meters.

10. An apparatus for storing and transporting a concave metallic membrane having a focal length defined by the concave surface of the membrane and having an aperture with a radius and diameter defined by the largest circumference of the membrane, comprising a mandrel having an axial length at least as great as the diameter of the metallic membrane and having a generally convex surface for which a radius "r" of the mandrel at any point along the axis of the mandrel is determined according to the formula:

$$r = b - \frac{x^2}{t}$$

where
- x = the distance of the point along the axis of the mandrel for which the radius of the mandrel is being determined as measured from the point along the axis for which the radius of the mandrel is a maximum and $$t = \left(\frac{2}{m}\right)\left(\frac{1}{b-s}\right)(a^2 + b^2 + s^2 - 2sb)$$

where
- m = a first constant
- b = the maximum radius of the mandrel and $$s = \left(\frac{b}{fP}\right)\sqrt{(fP)^2 - a^2}$$

where
- f = the focal length of the membrane
- a = the radius of the aperture of the membrane
- P = a second constant 11. The apparatus of claim 10 wherein the value of the first constant "m" and the value of the second constant "p" are varied whereby the formula defines a mandrel surface that accommodates metallic membranes having a particular focal length to diameter ratio and having a particular diameter.

12. The apparatus of claim 11 wherein the first constant "m" has a value of about 1.99 and the second constant "P" has a value of about 2.06 whereby the formula defines the radii for a mandrel surface having a focal length to diameter ratio of about 0.6 and for which the aperture is in the range of 1 to 7 meters.

13. An apparatus for storing and transporting a concave metallic membrane comprising a concave metallic membrane rolled onto a mandrel, wherein when the membrane is unrolled from the mandrel it has a focal length defined by the concave surface of the membrane and it has an aperture with a radius and diameter defined by the largest circumference of the membrane and wherein the mandrel has an axial length at least as great as the diameter of the metallic membrane and has a generally convex surface for which a radius "r" of the mandrel at any point along the axis of the mandrel is determined according to the formula:

$$r = b - \frac{x^2}{t}$$

where
x = the distance of the point along the axis of the mandrel for which the radius of the mandrel is being determined as measured from the point along the axis for which the radius of the mandrel is a maximum
and $$t = \left(\frac{2}{m}\right)\left(\frac{1}{b-s}\right)(a^2 + b^2 + s^2 - 2sb)$$

where
m = 1.99
b = the maximum radius of the mandrel and $$s = \left(\frac{b}{fP}\right)\sqrt{(fP)^2 - a^2}$$

where
f = the focal length of the membrane
a = the radius of the aperture of the metallic membrane
P = 2.06.

14. A method of manufacturing a concave metallic membrane type reflector comprising the steps of:
at a manufacturing site, forming a metallic membrane into a generally paraboloid-like shape having a focal length defined by the paraboloid-like surface of the metallic membrane and having an aperture with a radius and diameter defined by the largest circumference of the metallic membrane;
rolling the metallic membrane onto a non-cylindrical mandrel;
transporting the rolled-up metallic membrane and the non-cylindrical mandrel to a site that is remote from the manufacturing site; and
attaching the membrane to the reflector frame; wherein the non-cylindrical mandrel has an axial length at least as great as the diameter of the metallic membrane and for which a radius "r" of the mandrel at any point along the axis of the mandrel is determined according to the formula:

$$r = b - \frac{x^2}{t}$$

where
x = the distance of the point along the axis of the mandrel for which the radius of the mandrel is being determined as measured from the point along the axis for which the radius of the mandrel is a maximum and $$t = \left(\frac{2}{m}\right)\left(\frac{1}{b-s}\right)(a^2 + b^2 + s^2 - 2sb)$$

where
m = a first constant
b = the maximum radius of the mandrel and $$s = \left(\frac{b}{fP}\right)\sqrt{(fP)^2 - a^2}$$

where
f = the focal length of the membrane
a = the radius of the aperture of the metallic membrane
P = a second constant.

15. The method of claim 14 wherein the value of the first constant "m" and the second constant "P" are varied whereby the formula defines a mandrel surface that accommodates metallic membranes having a particular focal length to diameter ratio and having a particular diameter.

16. The method of claim 14 wherein the first constant "m" has a value of about 1.99 and the second constant "P" has a value of about 2.06.

* * * * *

UNITED STATES PATENT AND TRADEMARK OFFICE
CERTIFICATE OF CORRECTION

PATENT NO. : 5,237,337
DATED : AUGUST 17, 1993
INVENTOR(S) : HUTCHISON ET AL.

Figure 8A:
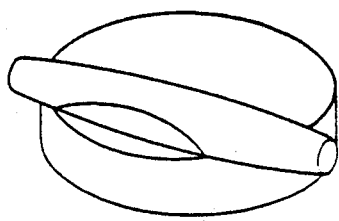
FIGS. 8a-b strate the steps of using the mandrel illustrated in FIG. 7 to remove a metallic membrane from the manufacturing fixture as shown in FIG. 5.
Figure 8B:
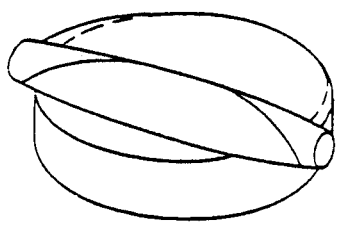
Figure 8C:
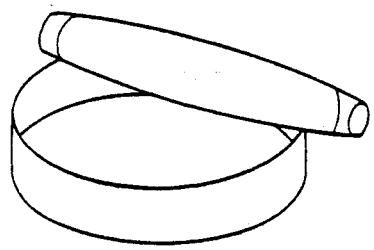
Figure 8D:
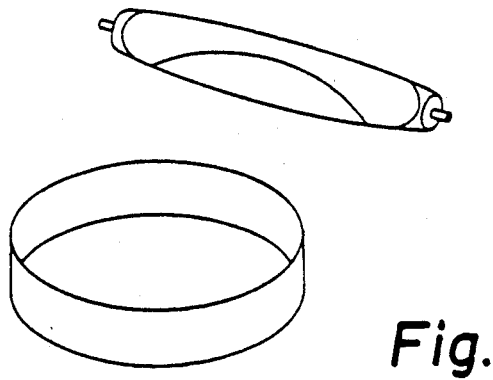

It is certified that error appears in the above-identified patent and that said Letters Patent is hereby corrected as shown below:

Column 2, line 51, "parabolio" should read -- parabolic --;

Column 3, line 1, "FIGS. 8a-b strate" should read -- FIGS. 8a-d illustrate --;

Column 4, line 24, "onehalf" should read -- one-half --; and

Column 9, line 16, "obtains" should read -- obtain --.

Signed and Sealed this

Third Day of May, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,237,337
DATED : August 17, 1993
INVENTOR(S) : Joseph A. Hutchison and Paul T. Schertz It is certified that error appears in the above-indentified patent and that said Letters Patent is hereby corrected as shown below:

Column 1, line 5, insert the following:
The U.S. Government has a paid-up license in this invention and the right in limited circumstances to require the patent owner to license others on reasonable terms as provided for by the terms of Contracts Numbered 55-2495 and 53-9663 awarded by Sandia National Laboratories.

Signed and Sealed this

Eleventh Day of October, 1994

Attest:

BRUCE LEHMAN

Attesting Officer

Commissioner of Patents and Trademarks